United States Patent [19]

Satzler et al.

[11] Patent Number: 5,191,952
[45] Date of Patent: Mar. 9, 1993

[54] TRACK-TYPE VEHICLE HAVING STEERABLE WHEELS

[75] Inventors: Ronald L. Satzler, Princeville; Edward E. Schmillen, Metamora, both of Ill.

[73] Assignee: Caterpillar Inc., Peoria, Ill.

[21] Appl. No.: 762,285

[22] Filed: Sep. 19, 1991

[51] Int. Cl.$^5$ .................... B62D 55/00; B62D 61/10
[52] U.S. Cl. .................... 180/9.52; 180/9.46; 180/24.02
[58] Field of Search .................... 180/9.44, 9.46, 9.52, 180/9.3, 9.38, 9.34, 9.5, 24.02

[56] References Cited

U.S. PATENT DOCUMENTS

| | | | |
|---|---|---|---|
| 1,416,379 | 5/1922 | Peone | 180/9.52 |
| 1,455,906 | 5/1923 | Cox | 180/9.52 |
| 2,057,211 | 10/1936 | Shere | 180/9.1 |
| 2,467,947 | 4/1949 | Skelton | 305/9 |
| 3,499,663 | 3/1970 | Hedlund et al. | 180/24.02 X |
| 3,652,106 | 3/1972 | Waterman | 280/405 R |
| 4,448,274 | 5/1984 | Van Der Lely | 180/15 |
| 4,631,919 | 12/1986 | Brennan | 180/24.02 X |
| 5,018,593 | 5/1991 | Hermann | 180/24.02 |

FOREIGN PATENT DOCUMENTS

| | | | |
|---|---|---|---|
| 0169629 | 12/1951 | Austria | 180/9.52 |
| 1035475 | 4/1953 | France | 180/9.52 |
| 2218231 | 9/1974 | France | 180/9.52 |
| 1597214 | 9/1981 | United Kingdom | 180/9.52 |

*Primary Examiner*—Charles A. Marmor
*Assistant Examiner*—Florian Zeender
*Attorney, Agent, or Firm*—Claude F. White

[57] ABSTRACT

A track-type vehicle having first and second endless track assemblies and first and second steerable wheels includes a weight management apparatus including a measuring assembly for measuring the angle of steer of the steerable wheels, a hydraulic cylinder connected between the frame of the vehicle and the axles of the steerable wheels, and an actuating device for actuating control valves which control pressure of the pressurized fluid to the hydraulic cylinder. Controlling the pressure of the pressurized fluid supplied to the hydraulic cylinder, as a function of the angle of steer of the steerable wheels, changes the ground pressure applied by the steerable wheels and the track assemblies. The pressure of the fluid supplied to the hydraulic cylinder also determines the amount of contact the track assemblies have with the ground. Steering of track-type vehicles is more difficult than wheel-type vehicles due to the large contact area of the track assemblies with the ground. The subject weight management apparatus reduces the contact area of the track assemblies and provides easier steering of the vehicle.

20 Claims, 7 Drawing Sheets

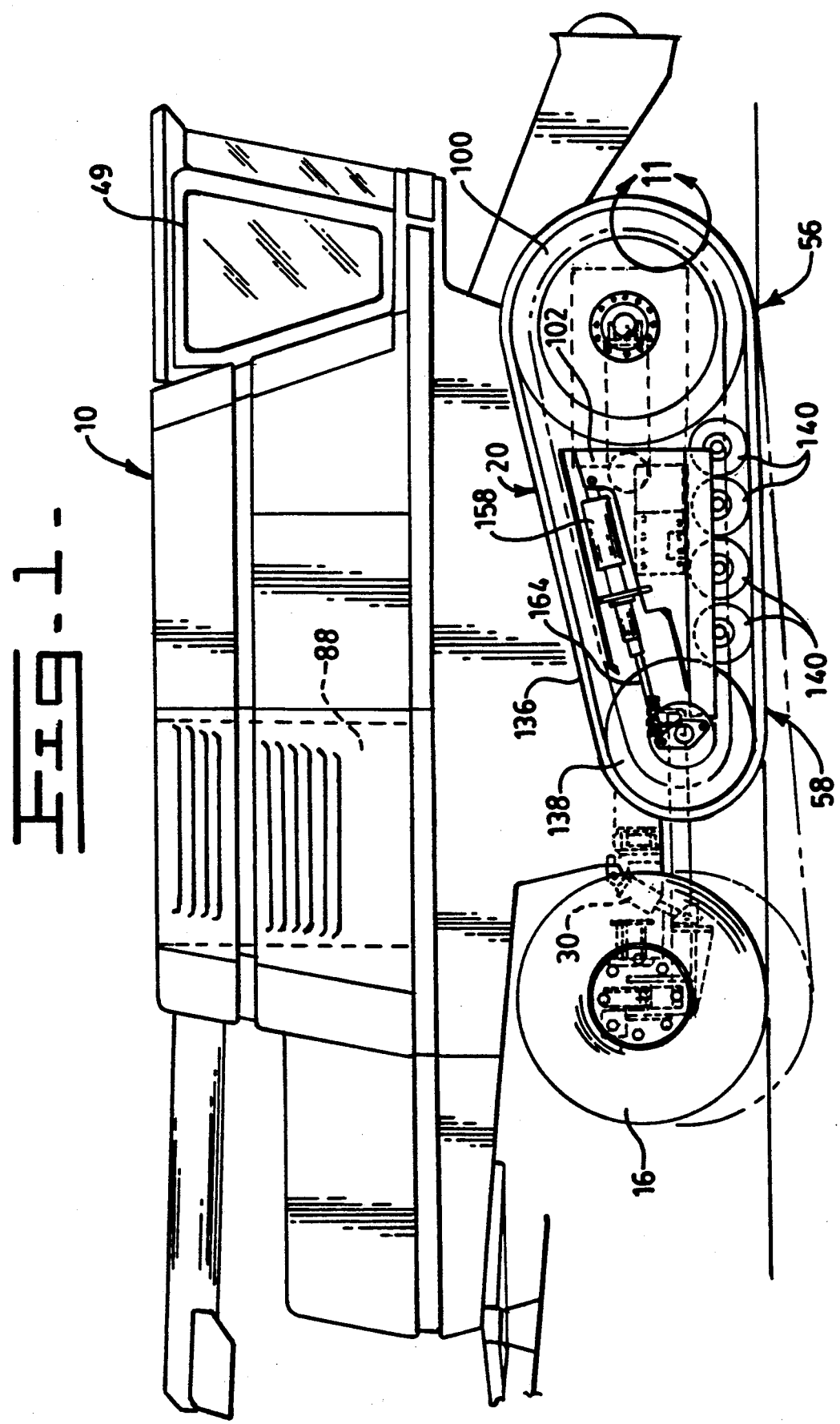

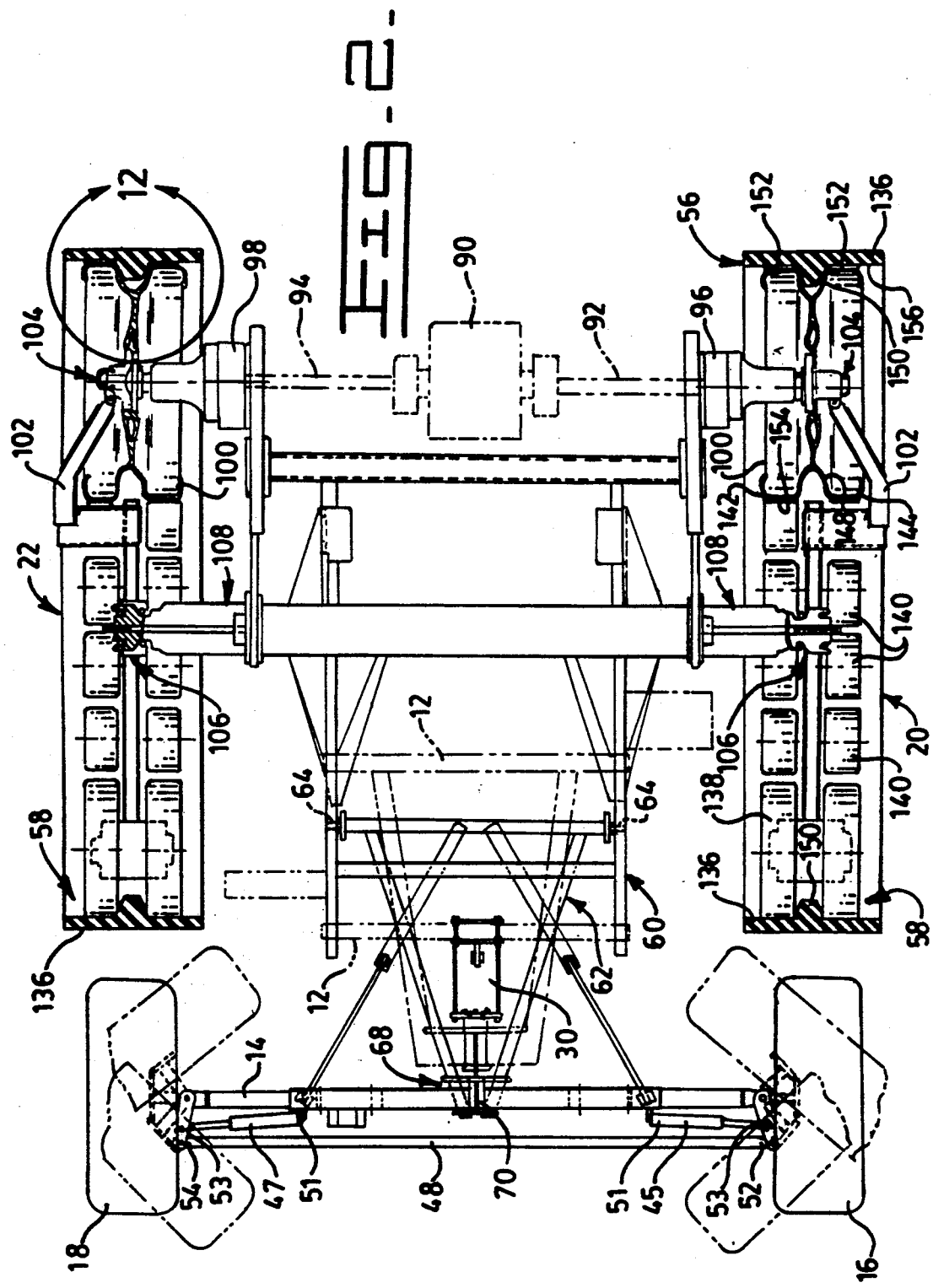

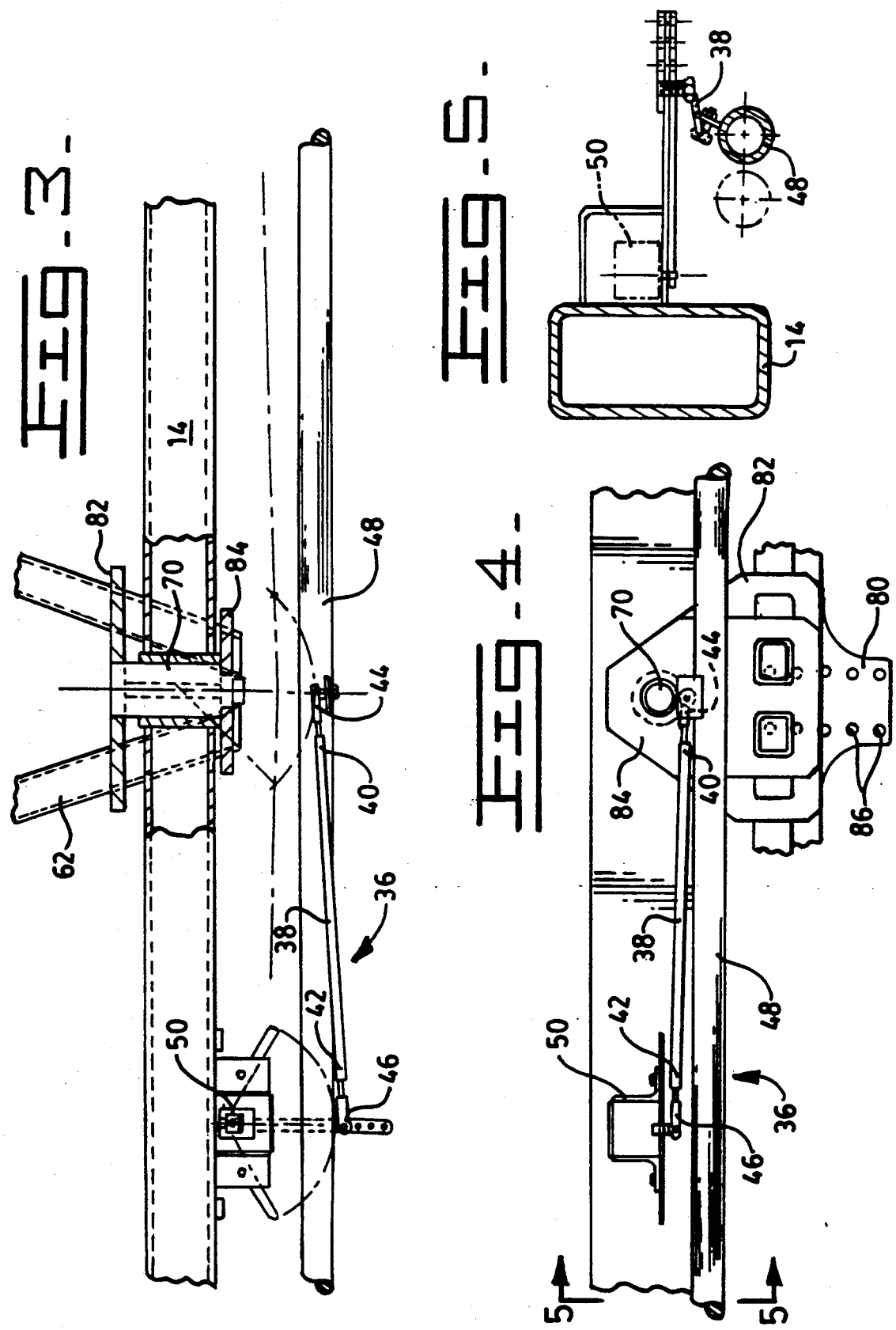

TRACK-TYPE VEHICLE HAVING STEERABLE WHEELS

TECHNICAL FIELD

This invention relates to track-type work vehicles and more particularly to a track-type vehicle having steerable wheels and a weight distributing apparatus for distributing the vehicle weight between the track assemblies and the wheels.

BACKGROUND ART

A large percentage of agricultural work vehicles are supported and propelled by four or more wheels on front and rear axles. In work conditions requiring low ground pressure and increased traction, as many as four additional wheels are added to the conventional four wheels. As an alternative to the four wheel agricultural vehicles, self-laying track-type work vehicles are often employed because they offer excellent traction and low ground pressure. Work vehicles having either metal chain track or elastomeric belt track are available. Although track-type work vehicles offer many advantages over wheel type vehicles, sharp turning of the track-type vehicles can disturb soil and vegetation. This is due to the large amount of ground contact offered by the track assemblies, such ground contact causing a shearing action during turning operations.

One type of a vehicle having a track structure and steerable wheels is disclosed in U.S. Pat. No. 1,455,906 issued to W. C. Cox on May 22, 1923. In this patent a motor vehicle is equipped with an endless track structure at the rear of the vehicle and conventional steerable wheels at the front of the vehicle. Cushioning means are provided in the track sections to cushion the movement of the vehicle wheels upon their respective tracks. A hand wheel is disposed in proximity to the seat of the drive to adjust the tracks.

Another type of traction apparatus is disclosed in U.S. Pat. No. 2,057,211, issued to A. T. Shere on Oct. 13, 1936. This patent discloses a track-laying type tractor having track-type structure at the rear and wheels at the front. Various other modifications are disclosed for converting an automobile into a crawler type tractor. This particular type of conversion would appear impractical in view of the different design requirements between automobiles and tractors.

The present invention is directed toward overcoming one or more of the problems as set forth above.

DISCLOSURE OF THE INVENTION

In one aspect of the present invention, a track-type vehicle has a main frame, an axle, and first and second steerable wheels. First and second endless track assemblies are positioned on each lateral side of the frame. First and second steering cylinders are connected between the axle and a respective steerable wheel. The vehicle further includes a source of pressurized fluid, a weight distributing cylinder, and means for controlling the pressure of the pressurized fluid to the cylinder. Additional means measure the angle of steer of the steerable wheels, and the control means are activated in response to the steer angle.

Prior art vehicles which are utilized in agricultural work operations are often equipped with wheels at the front and rear of the vehicle, such wheels serving to support and propel the vehicle. Wheel type vehicles, however, tend to cause undesirable soil compaction, and their use is somewhat limited in soft or wet soil conditions. Track-type vehicles provide greater traction in wet soil conditions and minimum soil compaction due to low ground pressure. However, track-type vehicles are generally more difficult to turn and manipulate and cause shearing action with the soil during turning.

The subject invention provides a track-type vehicle having steerable wheels and a weight management apparatus for changing the ground pressure applied by the steerable wheels and the track assemblies.

BRIEF DESCRIPTION OF THE DRAWINGS

FIG. 1 is a diagrammatic side elevational view of a vehicle incorporating the subject invention;

FIG. 2 is a diagrammatic plan view partly in section of the frame structure, the steerable wheels, and the track assemblies of the subject invention;

FIG. 3 is a diagrammatic plan view on an enlarged scale of the rear portion of the subject vehicle showing the rear axle, the tie rod, and steering angle measuring apparatus;

FIG. 4 is a diagrammatic rear elevational view, taken generally along the lines 4—4 of FIG. 3;

FIG. 5 is a diagrammatic sectional view taken generally along the lines 5—5 of FIG. 4;

FIG. 11 is a diagrammatic side elevational view or a portion of the drive wheel and belt showing the drive lugs, taken generally from the area marked 11 from FIG. 1; and FIG. 12 is a diagrammatic enlarged sectional view of the drive wheel, belt, and drive lugs, taken generally from the area marked 12 in FIG. 2.

BEST MODE FOR CARRYING OUT THE INVENTION

Figure 6:
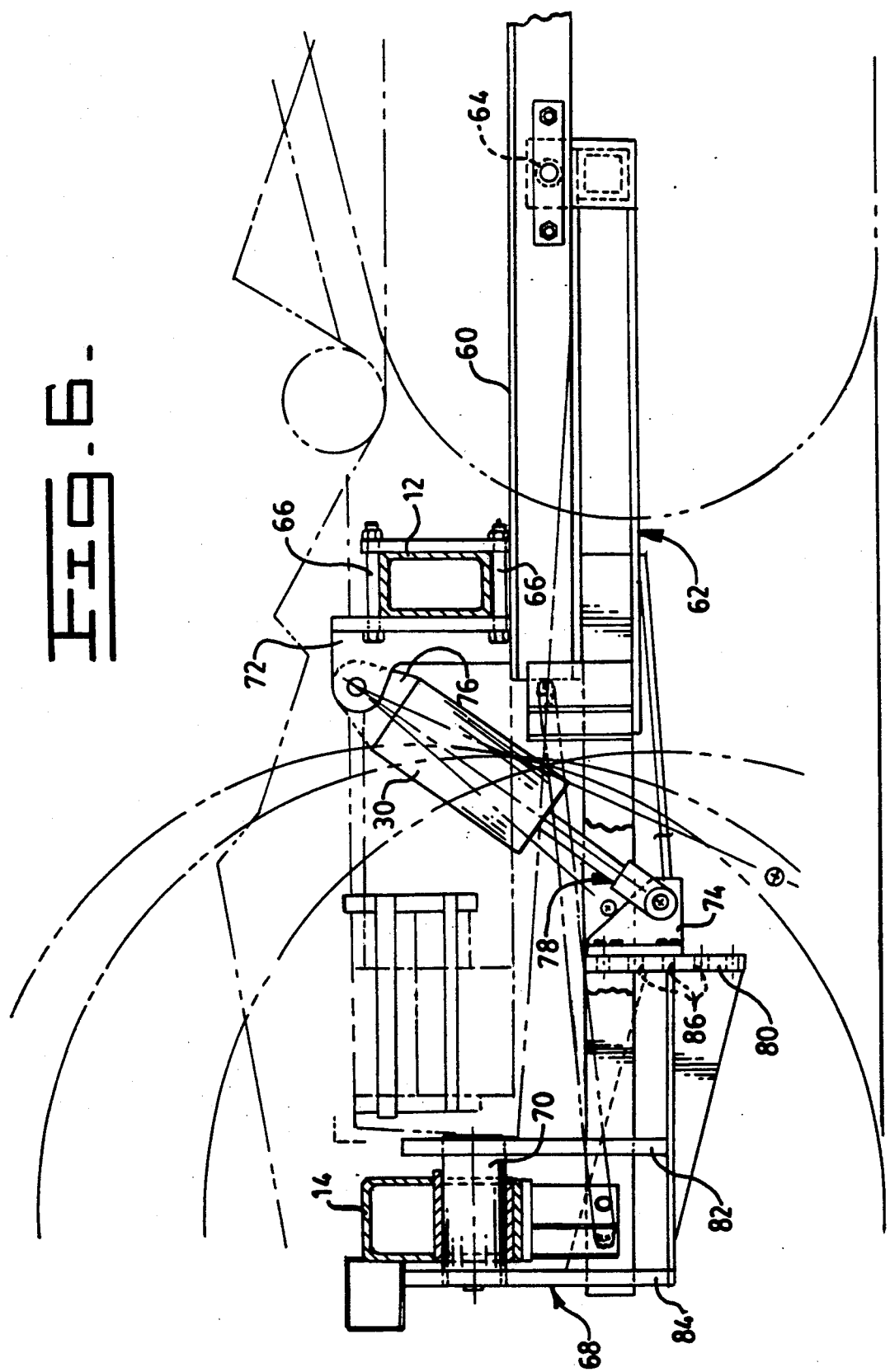
FIG. 6 is a diagrammatic side elevational view, on an enlarged scale, of a portion of the structure shown in FIG. 1, and showing the weight distributing cylinder and its connection between the first and second auxiliary frames.
Figure 7:
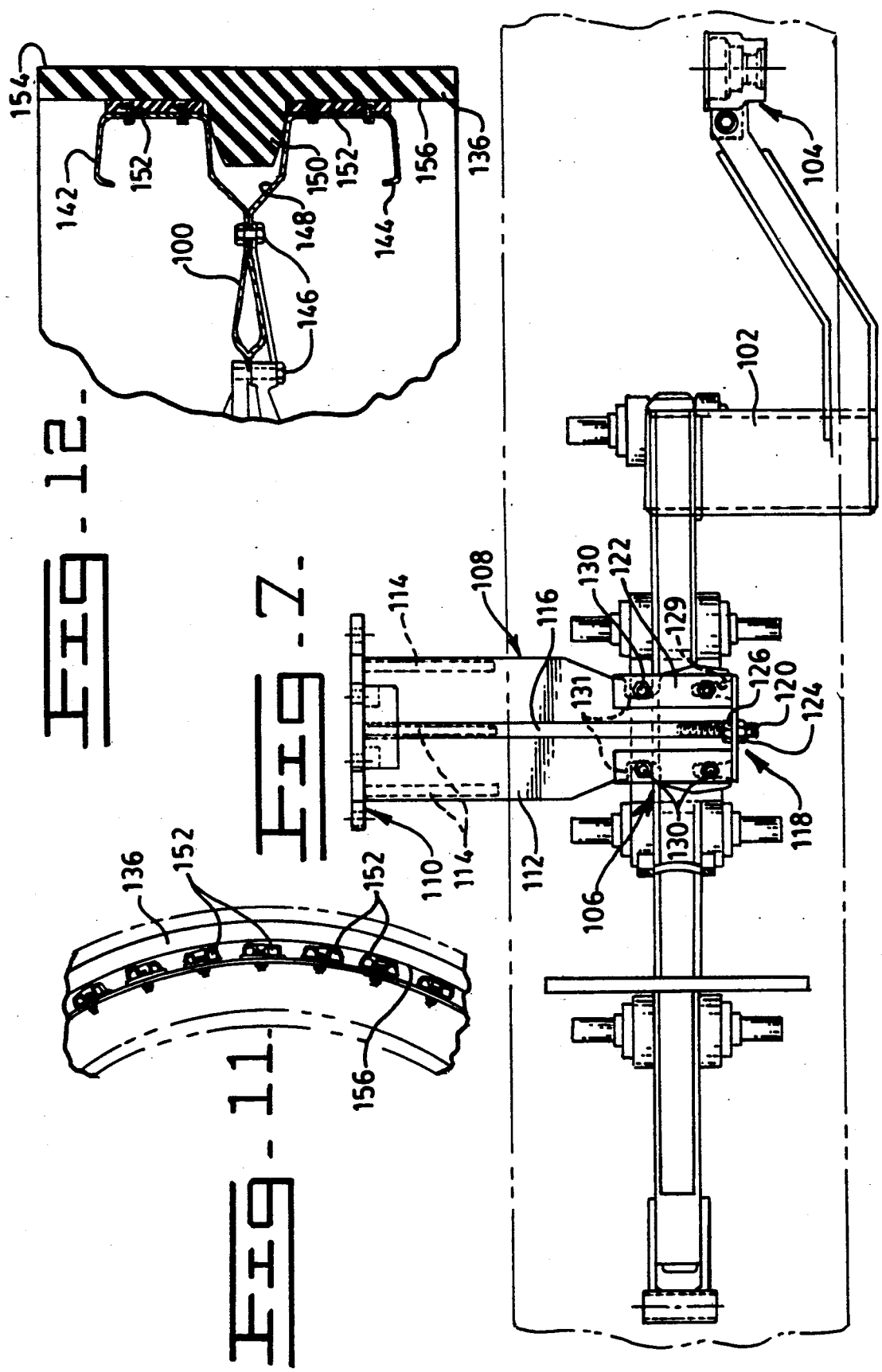
FIG. 7 is a diagrammatic plan view, on an enlarged scale, of a portion of the structure shown in FIG. 2, and showing the track roller frame and a supporting assembly.

Referring to the drawings, a track-type vehicle 10, such as a harvesting machine 10, has a main frame 12, an axle 14, and first and second steerable wheels 16,18 connected to the axle 14. The vehicle 10 further includes first and second endless track assemblies 20,22, with one track assembly positioned on each lateral side of the main frame 12.

A source 24 of pressurized fluid includes a fluid pump 26 and a fluid reservoir 28. The pressurized fluid is used to operate various fluid devices on the vehicle 10, including a weight distributing cylinder 30 which is connected between the vehicle frame 12 and the axle 14. A control means 32, such as a pressure control valve 34, controls the pressure of pressurized fluid to the cylinder 30. A measuring means 36 measures the angle of steer of the steerable wheels 16,18 and produces a signal in response to the steer angle. The measuring means 36 includes a link 38 having first and second ends 40,42 and first and second swivel joints 44,46 connected to the respective first and second ends 40,42. The first swivel joint 44 connects the link 38 to a tie rod 48 and the second swivel joint 46 connects the link 38 to a transducer 50, such as an electrical potentiometer 50. It is recognized that other types of mechanical and hydraulic sensors could be used.

The tie rod 48 has first and second ends 52,54 which are connected to respective first and second steerable wheels 16,18. The tie rod therefore follows the motion of the wheels 16,18 as they turn, and the link 38 also moves with the tie rod 48. The steerable wheels 16,18 are turned by first and second steering cylinders 45,47, which are controlled by a conventional hydraulic circuit and a steering wheel (not shown) in the operator's compartment 49. Each steering cylinder 45,47 has a first end portion 51 connected to the axle 14 and a second end portion 53 connected to one of the wheels 16,18. Since the second end 42 of the link 38 is connected to the transducer 50 by the second swivel joint 46, motion of the link 38 activates the transducer 50. The transducer 50 produces a signal which is directly proportional to the angle of steer of the wheels 16,18. This signal is relayed to the pressure control valve 34 which then generates a control signal which activates the control valve 34. The pressure supplied by the control valve 34 is varied as a function of the steer angle of the wheels 16,18. The control valve 34 therefore controls the pressure of the fluid in the weight distributing cylinder 30, and the degree of pressurization is a function of the magnitude of the control signal and the steer angle of the wheels 16,18.

Figure 8:
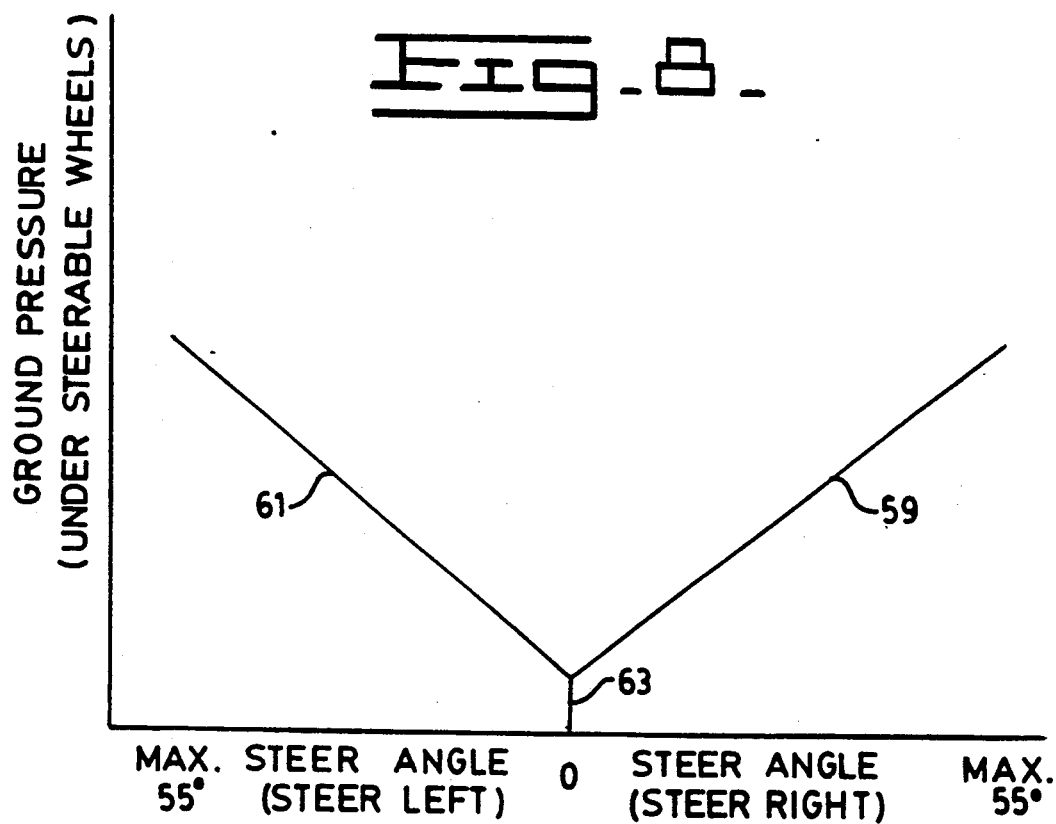
FIG. 8 is a diagrammatic illustration of a chart showing a steer angle plotted against ground pressure under the steerable wheels.
Figure 9:
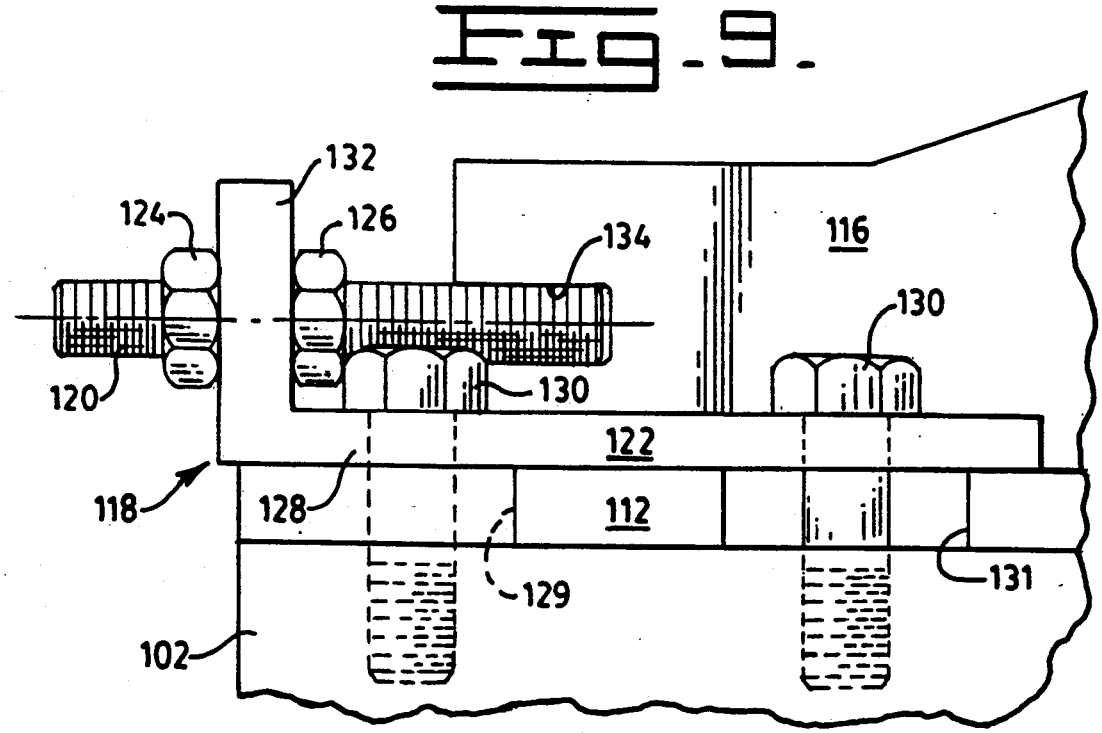
FIG. 9 is a diagrammatic side elevational view, on an enlarged scale, of the lateral adjusting mechanism.

Pressurization of the weight distributing cylinder 30 distributes the weight of the vehicle 10 between the track assemblies 20,22 and the steerable wheels 16,18. The more pressure applied to the cylinder 30, the more weight is shifted to the steerable wheels from the track assemblies 20,22. As the weight is shifted, the front portions 56 of the track assemblies 20,22 carry more weight and the rear portions 58 of the track assemblies carry less weight. As more of the weight is shifted to the front portions 56 of the track assemblies 20,22, the rear portions 58 of the track assemblies 20,22 are raised off of the ground. With particular reference to FIG. 8, the line 59 on the chart represents the steer angle plotted against the ground pressure under the steerable wheels in a steer right maneuver of the vehicle 10. The line 61 is the same as the line 59 in a steer left maneuver. The line 63 represents some minimum amount of ground pressure on the steerable wheels at a 0 degree steer angle.

With particular reference to FIGS. 2, 3, 4, and 6, the vehicle 10 includes first and second auxiliary frame assemblies 60,62 which are pivotally connected by a pivot pin 64. The first frame assembly is securely connected, as by welding, or by bolts 66 to the main frame 12 of the vehicle 10. The second frame assembly 62 has a first end portion 68 which is pivotally connected to the axle 14 by a pivot pin 70. A first bracket 72 is connected to the first auxiliary frame 60 and a second bracket 74 is connected to the second auxiliary frame 62. The weight distributing cylinder 30 has a first end portion 76 connected to the first bracket 72 and a second end portion 78 connected to the second bracket 74. The second auxiliary frame 62 includes first, second, and third mounting plates 80,82,84, with the first plate having a plurality of mounting holes 86. The second bracket 74 is connectable to the first mounting plate 80 using selected ones of the mounting holes 86. By mounting the second bracket 74 at various positions on the mounting plate 80, the rear portions 58 of the track assemblies 20,22 can be raised off the ground to various levels. The axle 14 is pivotally connected to the first end portion 68 of the second frame assembly 62 by the second and third mounting plates 82,84.

The vehicle 10 includes a power generating means 88, such as an engine 88, a transmission 90, first and second drive shafts 92,94, and first and second final drive assemblies 96,98. Each of the track assemblies 20,22 includes a drive wheel 100 and a track roller frame structure 102. The drive wheels 100 are powered by the engine 88 through the transmission 90, the drive shafts 92,94 and the final drive assemblies 96,98. Each of the track roller frame structures 102 includes a first end portion 104 which is connected to a respective drive wheel 100, and a middle portion 106 which is connected to the vehicle main frame 12. The middle portion 106 of each track roller frame structure 102 is connected to the main frame 12 by a supporting assembly 108.

Each of the supporting assemblies 108 includes a mounting portion 110, an extension plate 112 a plurality of ribs 114, and a reinforcing plate 116, The mounting portion 110 rigidly connects the supporting assembly 108 to the vehicle main frame 12. The supporting assembly 108 includes a lateral adjustment mechanism 118, including a threaded rod 120, an L-shaped plate 122 positioned on the rod 120, and first and second nuts 124,126 threaded onto the rod 120. The first leg 128 of the L-shaped plate 122 is adapted to be secured to the track roller frame structure 102 by a plurality of bolts 130 and the second leg 132 of the L-shaped plate 122 is positioned on the threaded rod 120. The first and second nuts 124,126 are threaded onto the threaded rod 120 with the second leg 132 adapted to be clamped between the nuts 124,126. The bolts 130 also clamp the extension plate 112 to the track roller frame structure 102 with the extension plate 112 being sandwiched between the L-shaped plate 122 and the track roller frame structure 102. The bolts 130 pass through first and second slots 129,131 in the extension plate 112. The reinforcing plate 116 has a slot 134 for receiving a portion of the rod 120. Once positioned within the slot 134 the rod 120 is connected, as by welding, to the reinforcing plate.

The lateral adjustment mechanism 118 is used to make small lateral adjustments of the track roller frame 120 with respect to the remainder of the vehicle 10. The track assemblies 20,22 are preferably belted type track assemblies having an endless elastomeric belt 136 encircling the drive wheel 100, an idler wheel 138, and a plurality of guide rollers 140. Each of the guide wheels 100 includes first and second wheel portions 142,144 which are connected together by a plurality of bolts 146 to form a groove 148 therebetween. The belt 136 has a plurality of guide blocks 150 formed on the inner surface 148, with the groove 148 adapted to guide the belt 146 by the guide blocks 150. In order to prevent excessive wear and heat buildup from frictional contact between the guide blocks 150 proper belt alignment is essential.

To change the alignment of the belt 136, moving the track roller frame toward the vehicle, the bolts 130 are loosened, the second nut 126 is loosened from engagement with the second leg 132, and the first nut 124 is tightened further onto the threaded rod 120. Since the bolts 130 are within the slots 129,131 the L-shaped plate 122 and the track roller frame 102 can move relative to the extension plate 112. Once the lateral adjustment has been made, the second nut 126 is re-tightened against the second leg 132 and the bolts 130 are re-tightened against the extension plate 122. Changing the alignment of the belt 136 in the opposite direction, the same procedure is followed, except the first nut 124 is first loosened and the second nut is tightened. Alignment of the belt 136 can be changed about one or two degrees. The alignment procedure is simplified if the track roller frame 102 is suspended off the ground in some manner.

Each of the drive wheels 100 includes a plurality of resilient drive lugs 152 connected to the circumferential surface 154 of the drive wheels 100. The drive lugs 152 frictionally contact the inner surface 156 of the drive belt 136 and frictionally rotate the belt 136 to propel the vehicle 10.

Figure 10:
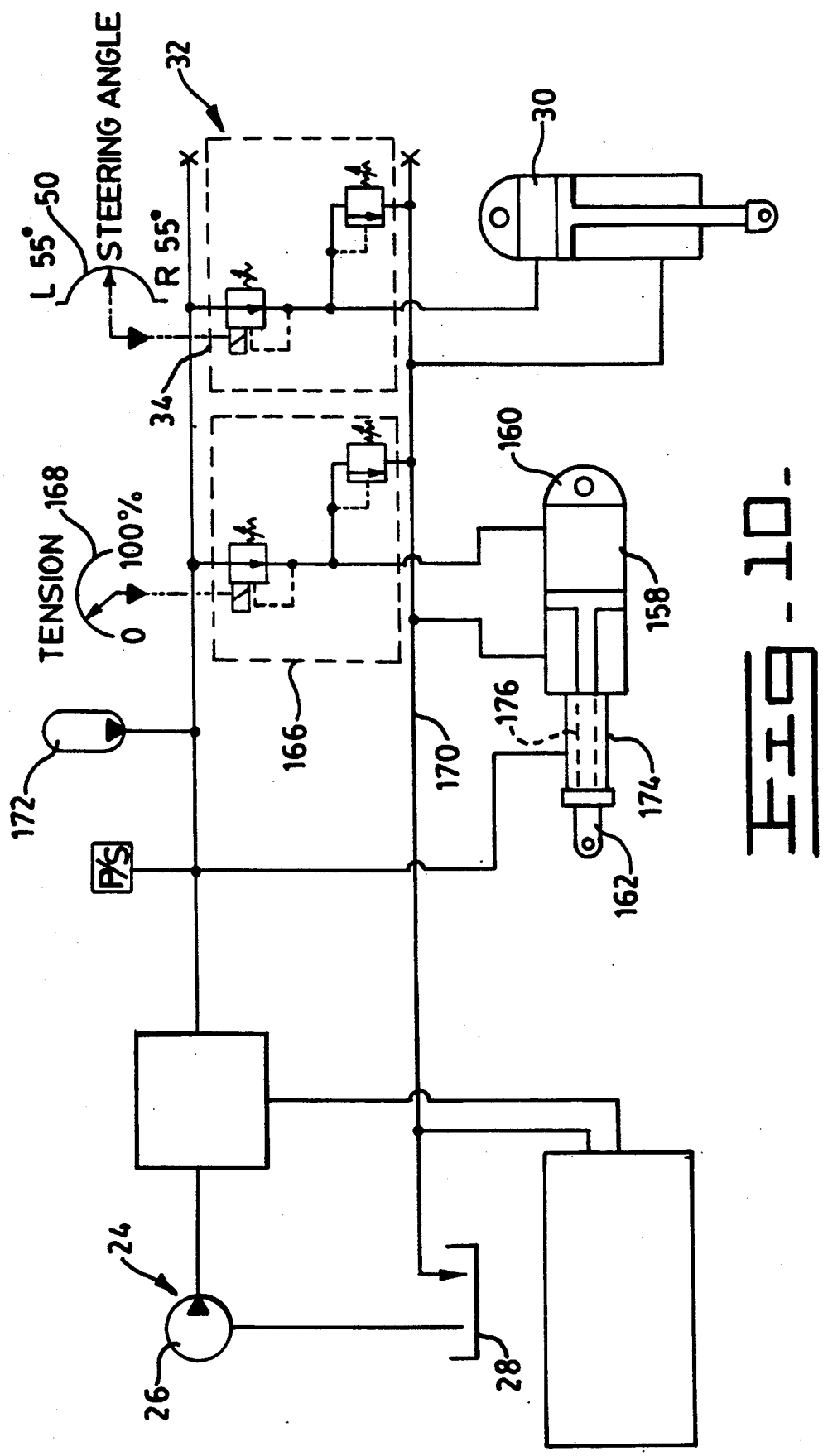
FIG. 10 is a schematic illustration of a hydraulic circuit for the subject invention.

With particular reference to FIGS. 1 and 10, the tension between the drive wheel 100 and the belt 136 is established and maintained by a hydraulic cylinder 158 which is powered by the fluid pump 26. The head end portion 160 of the cylinder 158 is connected to the track roller frame 102 and the rod end portion 162 of the cylinder 158 is connected to the idler wheel 138 by an arm 164. By pressurizing the head end portion 160, the drive wheel 100 and the idler wheel 138 are pushed apart to tension the drive belt 136. Pressure to the cylinder 158 is controlled by a control valve 166 and an adjustable control switch 168. The hydraulic cylinder 158 also provides recoil for the track assembly 20. When debris or foreign material becomes trapped between the inner surface 156 and the drive wheel 100, fluid is forced out of the head end portion 160 of the cylinder 158, across a relief portion of the control valve 166, into a drain line 170, and back to the reservoir 28. Once the debris has been expelled, an accumulator 172 provides flow and pressure to the head end portion 160 to extend the idler wheel 138 sufficient to keep the belt tight. A rod locking mechanism 174 is adapted to lock the rod 176 of the hydraulic cylinder 158 in position when the vehicle 10 is shut down and the pump 26 is no longer providing pressurized fluid. The rod locking mechanism 174 automatically locks onto the rod 176 in the absence of hydraulic pressurized fluid. This prevents release of the tension between the belt 136 and the drive wheel 100 when the vehicle 10 is not being operated.

INDUSTRIAL APPLICABILITY

With reference to the drawings, the subject track-type vehicle 10 with steerable wheels 16,18 is particularly useful as an agricultural vehicle, such as a combine harvesting vehicle. The track assemblies 20,22 provide good traction and low ground pressure, and the steerable wheels 16,18 provide the primary steering function for the vehicle 10.

The weight management apparatus 29, including the weight management cylinder 29, controls the amount of ground pressure applied to the steerable wheels 16,18 and to the track assemblies 20,222. When the steering cylinders 45,47 are activated to turn the wheels 16,18, the tie rod 48 follows the motion of the wheels 16,18. The link 38, which is connected at a first end 38 to the tie rod 48 and at a second end to the transducer 50, also follows the motion of the wheels 16,18. The transducer 50 produces a signal, which is proportional to the angle of steer of the wheels 16,18, to the modulatable control valve 34. The control valve 34 sends pressurized fluid to the weight distributing cylinder 30, which is connected between the vehicle main frame 12 and the axle 14. The cylinder 30 pushes down on the axle and steerable wheels 16,18 and lifts up on rear portion 58 of the track assemblies 20,22.

Lifting up on rear portion 50 of the track assemblies 20,22 reduces the contact pressure of the track assemblies 20,22 with the ground and provides easier steering of the vehicle 10. The amount of lifting force applied to the rear portion 50 of the track assemblies 20,22 is a direct function of the steer angle of the steerable wheels 16,18. As the steering cylinders 45,47 return the wheels 16,18 to a straight position, the signal produced by the transducer 50 is removed from the control valve 34 and the control valve 34 returns to a preset minimum pressure position. The track assemblies 20,22 then return to their previous contact position with the ground until the steerable wheels 16,18 are again turned by the steering cylinders 47,49. Lifting up on the rear portion 58 of the track assemblies 20,22 shifts the weight of the vehicle 10 to the steerable wheels 16,18 and to the front portion 56 of the track assemblies 20,22.

Other aspects, objects, and advantages of this invention can be obtained from a study of the drawings, the disclosure, and the appended claims.

I claim:

1. A track-type vehicle having a main frame, an axle, and first and second steerable wheels connected to said axle, comprising:
   first and second endless track assemblies, one positioned on each lateral side of said frame;
   means for steering said steerable wheels:
   a source of pressurized fluid;
   a weight distributing cylinder connected between said frame and said axle;
   means for controlling the pressure of said pressurized fluid to said cylinder in response to receiving a control signal;
   means for measuring the angle of steer of said steerable wheels and producing a signal in response thereto; and
   means for receiving the angle of steer signal, generating a control signal, and delivering said control signal to said control means.

2. A track-type vehicle, as set forth in claim 1, wherein said control means includes a modulatable control valve, and the degree of modulation is a function of said steer angle.

3. A track-type vehicle, as set forth in claim 1, including a tie rod connected to said first and second steerable wheels, and wherein said means for measuring the angle of steer of said steerable wheels includes a link having a first end connected to said tie rod and a second end connected to said signal producing means.

4. A track-type vehicle, as set forth in claim 1, wherein said signal producing means includes a transducer.

5. A track-type vehicle, as set forth in claim 1, wherein said weight distributing cylinder is adapted to be pressurized by said source of pressurized fluid and the degree of pressurization is a function of the magnitude of said control signal and said steer angle of said steerable wheels.

6. A track-type vehicle, as set forth in claim 1, wherein said vehicle includes a power generating means, each of said track assemblies includes a drive wheel and a track roller frame structure, said drive wheel being powered by said power generating means, and said track roller frame having a first end portion connected to said drive wheel and a middle portion connected to said vehicle main frame.

7. A track-type vehicle, as set forth in claim 1, wherein said means for steering said steerable wheels includes first and second steering cylinders, each having a first end portion connected to said axle and a second end portion connected to one of said steerable wheels.

8. A track-type vehicle, as set forth in claim 1, including a first auxiliary frame assembly, a second auxiliary frame assembly, and a pivot joint connecting said first and second auxiliary frame assemblies.

9. A track-type vehicle, as set forth in claim 8, including means for pivoting said axle relative to said frame, and said second auxiliary frame has a first end portion connected to said pivoting means.

10. A track-type vehicle, as set forth in claim 8, including a first bracket connected to said first auxiliary frame, a second bracket connected to said second auxiliary frame, said weight distributing cylinder being connected between said first and second brackets.

11. A track-type vehicle, as set forth in claim 10, wherein said second auxiliary frame includes a mounting plate having a plurality of mounting holes, said second bracket being connectable to said mounting plate at a plurality of positions using selected ones of said mounting holes.

12. A track-type vehicle, as set forth in claim 1, including first and second supporting assemblies connecting a respective one of said track roller frames to said main frame, each supporting assembly including means for adjusting each track assembly laterally.

13. A track-type vehicle, as set forth in claim 12, wherein each of said adjusting means includes a rib on each supporting assembly, a threaded rod secured to said rib, first and second nuts threaded onto said threaded rod, and an L-shaped plate having a first leg secured to the track roller frame and a second leg positioned on said threaded rod between said first and second nuts.

14. A weight management apparatus for a track-type vehicle having a power source, first and second steerable wheels, a main frame, and an axle and a tie rod connecting said first and second wheels, comprising:
first and second endless track assemblies, one positioned on each lateral side of said vehicle, and each powered by said power source;
first and second steering cylinders, each having a first end portion connected to said axle and a second end portion connected to one of said steerable wheels;
a source of pressurized fluid, including a fluid pump and a fluid reservoir;
a weight distributing fluid operated cylinder having a first end portion connected to said frame and a second end portion connected to said axle;
means for controlling the flow of said pressurized fluid to said fluid operated cylinder, said means including a modulatable control valve;
means for measuring the angle of steer of said steerable wheels including a link having a first end portion connected to said tie rod; and
means for producing a signal in response to said steer angle, said link having a second end portion connected to said signal producing means.

15. A weight management apparatus, as set forth in claim 14, wherein the degree of modulation of said control valve is a function of said steer angle of said steerable wheels.

16. A weight management apparatus, as set forth in claim 14, wherein said weight distributing cylinder is adapted to be pressurized by said source of pressurized fluid and the degree of pressurization is a function of the angle of steer of said steerable wheels.

17. A weight management apparatus, as set forth in claim 14, wherein said signal producing means includes an electrical transducer.

18. A track-type vehicle having a main frame, an axle, and first and second steerable wheels connected to said axle, comprising:
first and second endless track assemblies, one track assembly positioned on each lateral side of said frame, each track assembly including an endless elastomeric track belt;
a weight distributing fluid operated cylinder connected between said frame and said axle;
a hydraulic system, including a fluid pump and a fluid reservoir;
means for controlling flow of fluid from said pump to said cylinder, including a modulatable pressure reducing control valve;
means for steering said steerable wheels;
means for measuring the angle of steer of said steerable wheels, including a following link having a first end portion connected to said steering means;
means for producing a signal in response to and as a function of said steer angle, said link having a second end portion connected to said signal producing means; and
means for delivering said signal to said control valve.

19. A track-type vehicle, as set forth in claim 18, wherein each of said track assemblies includes a drive wheel having an outer circumferential surface, and a plurality of resilient drive lugs are connected to said circumferential surface, said drive lugs being substantially evenly spaced one from the other.

20. A track-type vehicle, as set forth in claim 18, including an adjusting mechanism for moving each track assembly laterally.

* * * * *